Oct. 2, 1928.
J. C. McCUNE
1,685,855
FLUID PRESSURE BRAKE
Filed Oct. 19, 1926
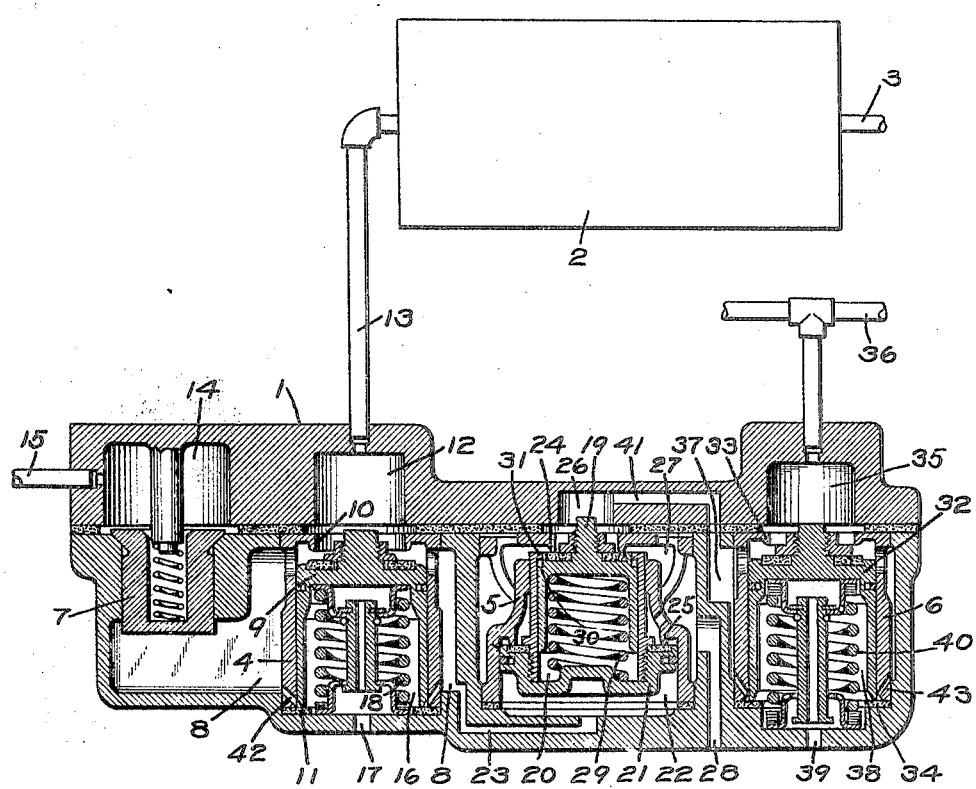
INVENTOR
JOSEPH C. McCUNE
BY Wm. N. Cady
ATTORNEY Patented Oct. 2, 1928.

1,685,855

UNITED STATES PATENT OFFICE.

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed October 19, 1926. Serial No. 142,636.

This invention relates to fluid pressure brakes, and more particularly to a brake equipment in which the brake pipe is charged with fluid under pressure from the main reservoir.

In certain types of fluid pressure brake equipments, fluid under pressure for controlling the application and release of the brakes is taken from a main reservoir and is controlled by the manipulation of a brake valve device. If the pressure in the main reservoir should fail or become seriously depleted, it may prevent the operator from making an application of the brakes, when desired.

The principal object of my invention is to provide means for automatically causing an emergency application of the brakes under the above circumstances.

In the accompanying drawing, the single figure is a sectional view of a valve device constructed in accordance with my invention.

According to the drawing, a valve device 1 is associated with a main reservoir 2 adapted to be charged with fluid under pressure through a pipe 3, by the operation of the usual air compressor (not shown).

The valve device 1 may comprise a casing containing a cut-off valve device 4, a vent valve device 5, a protection valve device 6, and a check valve device 7.

The cut-off valve device 4 may comprise a valve piston 9 adapted, in one position, to seal against a seat ring 10 and in the opposite position to seal against a gasket 11.

When the cut-off valve piston 9 engages the seat ring 10 the inner seated area is constantly subject to fluid at main reservoir pressure in the chamber 12 which chamber is connected through pipe 13 with the main reservoir 2. The outer seated area of the valve piston 9 is open to chamber 8 at one side of the check valve 7, the chamber 14 at the opposite side of said check valve being connected to a main reservoir pipe 15.

The chamber 16, at the spring side of the cut-off valve piston 9, is connected to the atmosphere through port 17 and contains a coil spring 18 which acts on said valve piston.

The vent valve device 5 may comprise a piston 21, contained in piston chamber 22 and provided with a cylindrical extension having a chamber 20, in which is mounted a valve piston 19. A coil spring 29 is interposed between the piston 21 and the valve piston 19.

In its position engaging the seat ring 24, the inner seated area of the valve piston 19 is subject to the pressure in chamber 26, while the outer seated area communicates with chamber 27, which is connected to the atmosphere through passage 28.

In order to prevent leakage of fluid under pressure from chamber 22 past the piston 21, said piston is provided with a seat adapted to engage a seat ring 25. In order to ensure that the valve piston 19 will tightly engage the seat ring 24, when piston 21 is in engagement with the seat ring 25, a limited relative movement of the valve piston 19 is permitted, and spring 29 then acts to yieldingly hold the valve piston 19 in engagement with the seat ring 24.

When the piston 21 moves away from the position shown in the drawing, relative movement of valve piston 19 is limited by a shoulder 30 on the valve piston 19 engaging a shoulder 31 of the piston 21.

The protection valve device 6 is in the form of a valve piston 32, adapted in one position to engage a seat ring 33, and in the opposite position to seal against a gasket 34.

When the protection valve piston 32 engages the seat ring 33, the inner seated area is subject to fluid at brake pipe pressure in chamber 35, which communicates with the usual brake pipe 36, while the outer seated area communicates with chamber 37 which is connected through passage 41 to chamber 26.

The valve piston 32 has chamber 38 at one side connected to the atmosphere through port 39 and is subject to the pressure of a spring 40.

In operation, the main reservoir 2, is charged with fluid under pressure in the usual manner and main reservoir pressure builds up in chamber 12 and acts against the inner seated area of the cut-off valve piston 9. When main reservoir pressure has been increased to a degree sufficient to overcome the pressure of the spring 18, the cut-off valve piston 9 is moved away from the seat ring 10.

As soon as the seal between the cut-off valve 9 and the seat ring 10 is broken, the pressure of fluid in chamber 10 immediately becomes effective upon the entire upper area of the cut-off valve piston 9 and quickly moves said valve piston to the normal operating position, as shown in the drawing, in which position said valve piston 9 seals against the gasket 11.

With the cut-off valve piston 9 in the normal operating position, fluid at main reservoir pressure in chamber 12 flows into chamber 8, and acts against the check valve 7 to lift it and permit flow into chamber 14 and thence into the main reservoir pipe 15 and to the brake valve device in the usual manner.

Fluid under pressure in chamber 8 also flows through passage 23 into chamber 22, wherein it causes the piston 21 to be moved to the position shown in the drawing, in which the valve piston 19 is seated on the seat ring 24 and thereby cuts off communication between chambers 26 and 27.

Fluid under pressure from the main reservoir pipe 15 is supplied through the usual brake valve device (not shown) to the brake pipe 36, which communicates with chamber 35, wherein said pressure builds up on the inner seated area of the protection valve piston 32, until the pressure becomes sufficient to overcome the pressure of the opposing spring 40. The protection valve piston 32 then starts to leave its seat against the seat ring 33, thereby exposing the full area of said valve piston to brake pipe pressure, which quickly moves valve piston 32 to the position shown in the drawing, in which it seals against the gasket 34.

The protection valve piston 32 being seated against gasket 34, permits fluid at brake pipe pressure in chamber 35 to flow into chamber 37 and thence through passage 41 into chamber 26. The valve piston 19 being seated against seat ring 24, permits a pressure equal to that in the brake pipe to build up in chambers 26 and 37.

In case the pressure of the fluid in the main reservoir 2 becomes reduced to a predetermined degree, through leakage from the main reservoir at the pipe connections, by reason of a pipe breaking, or a compressor failure, the pressure of spring 18 causes the cut-off valve piston 9 to start moving toward the seat ring 10 and away from the gasket 11. As soon as valve piston 9 leaves the gasket 11, the fluid under pressure in chamber 8 flows through port 42 into spring chamber 16 and to the atmosphere through port 17, thereby causing a sudden reduction in the pressure in chamber 8 and an increase in the pressure in spring chamber 16, which supplements the pressure of spring 18 to quickly shift the valve piston 9 against the seat ring 10, thereby cutting off further communication between the main reservoir 2 and chamber 8.

After the cut-off valve piston 9 has seated against the seal ring 10, the fluid under pressure in chamber 8 and chamber 22, which communicates therewith, through passage 23, vents to the atmosphere through ports 42 and port 17.

The fluid under pressure being vented from chamber 22 permits the fluid at brake pipe pressure in chamber 26, acting against the valve piston 19 inside the seat ring 24, to cause the valve piston 19 to move in a downward direction. As soon as the valve piston 19 leaves the seat ring 24 the fluid at brake pipe pressure, in chamber 26, becomes effective over the total exposed area of the valve piston 19 and causes it to quickly move to its open position, thereby connecting chamber 26 to chamber 27 and to the atmosphere through passage 28.

The brake pipe 36 being connected to chamber 26, by way of chamber 35, past the open protection valve piston 32 and through passage 41, fluid pressure therein is also vented to the atmosphere through passage 28, until the pressure of spring 40 causes the protection valve piston 32 to move from its seat on the gasket 34 towards the seat ring 33. As soon as the seal of the protection valve 32 against gasket 34 is broken, fluid under pressure in chamber 37 flows through ports 43 into spring chamber 38, wherein it supplements the pressure of spring 40 and quickly causes the valve piston 32 to move against the seat ring 33, thus cutting off further communication between the brake pipe 36 connected to chamber 35 and chamber 37 connected to the atmosphere. Fluid under pressure in spring chamber 38 is also vented to atmosphere through port 39.

The capacity of the vent valve device 5 when open to vent brake pipe fluid from chamber 26 to atmosphere through passage 28, is such as to provide an emergency rate of reduction in the fluid under pressure in the brake pipe 36 prior to the closing of the protection valve piston 32. This emergency rate of reduction in the brake pipe pressure produces an automatic emergency application of the brakes in the well known manner.

The above description of the operation of my invention is based upon the operation of a single car, in which case the protection valve device 6 and check valve device 7 serves no useful function.

In case there are two or more cars in a train, the main reservoir pipe 15 and brake pipe 36 on each car are connected with the similar pipes on adjoining cars, so that there are two separate pipe lines running throughout the train. With each car equipped with a main reservoir and means for charging the main reservoir, fluid under pressure is supplied from each car to the main reservoir pipe 15. There is always the possibility, however, that in initially charging the brake equipment on the train, a main reservoir pressure sufficient to cause operation of the cut-off valve device 4 may be acquired on one car ahead of the other cars.

If, in charging a train, the cut-off valve device 4 operates on one car ahead of the other cars, to supply fluid under pressure from the main reservoir 2 to the main reservoir pipe 15, the main reservoir pipe throughout the train will tend to be charged from the main reservoir of the car on which the cut-off valve device first operates. With the brake valve device on the leading car in release position, fluid under pressure will be supplied from the main reservoir pipe to the brake pipe, running throughout the train, and thus also charge said brake pipe.

On all of the cars of the train on which the cut-off valve device 4 has not operated, the chamber 8 is connected to atmosphere through ports 42 and port 17. The check valve 7, however, prevents the fluid pressure building up in chamber 14, from the main reservoir pipe 15 from flowing into chamber 8 and thence to atmosphere.

The pressure of spring 40 beneath the protection valve piston 32 holds said valve closed against the pressure built up in chamber 35, so that on all the cars on which the cut-off valve 9 has not operated, fluid at brake pipe pressure in chamber 35 cannot be vented to atmosphere through chamber 37, passage 41, chambers 26 and 27 and passage 28.

The fluid pressure required to shift the protection valve piston 32 away from the seat ring 33 and against the pressure of spring 40 is sufficiently in excess of the pressure required to shift the cut-off valve piston 9 away from the seat ring 10 to ensure movement of every cut-off valve 4 on the train to connect the main reservoir to the main reservoir pipe 15 prior to the opening of a single protection valve.

The check valve 7 and protection valve device 6, therefore, are means for preventing the loss of fluid under pressure to the atmosphere when initially charging the brake equipment on a train wherein a cut-off valve device 4 on one car operates ahead of a similar occurrence on the other cars.

In case the pressure of the fluid in the main reservoir 2, on any one car in the train, becomes reduced sufficiently to permit the cut-off valve device 4 on that car to operate, an emergency rate of reduction will be produced in the brake pipe 36 in the same manner as heretofore described for a single car. The brake pipe being continuous throughout the train, the emergency rate of reduction will be transmitted to the valve device on each car, which will automatically apply the brakes.

Having now described my invention, what I claim as new and desire to secure by Letters Patent, is:—

1. In a fluid pressure brake, the combination with a main reservoir, a main reservoir pipe, and a brake pipe, of a cut-off valve device operated upon a predetermined reduction in pressure in the main reservoir for cutting off communication from the main reservoir to the main reservoir pipe and a vent valve device controlled by said cut-off valve device and operated by venting fluid from one side thereof for venting fluid from the brake pipe to effect an application of the brakes.

2. In a fluid pressure brake, the combination with a main reservoir and brake pipe, of a vent valve device operated upon a predetermined reduction in pressure in the main reservoir for venting fluid from the brake pipe and a valve device for cutting off communication from the brake pipe to said vent valve device until the brake pipe pressure has been increased to a predetermined degree.

3. In a fluid pressure brake, the combination with a main reservoir, a main reservoir pipe, and a brake pipe, of a vent valve device for venting fluid from the brake pipe to effect an application of the brakes, a cut-off valve device operated upon a predetermined reduction in brake pipe pressure for operating said vent valve device to open communication through which fluid is vented from the brake pipe, and a protection valve device for cutting off communication from the brake pipe to said vent valve device until the brake pipe pressure has been increased to a predetermined degree.

4. In a fluid pressure brake, the combination with a main reservoir and a brake pipe, of a vent valve device normally subject to the opposing pressures of the brake pipe and main reservoir, and a valve device operated upon a reduction in pressure in the main reservoir for venting fluid from the main reservoir side of said vent valve device, to thereby operate said vent valve device to vent fluid from the brake pipe.

In testimony where of I have hereunto set my hand.

JOSEPH C. McCUNE.